June 6, 1933.  T. E. MURRAY, JR  1,912,993
METHOD OF WELDING HOLLOW ARTICLES
Filed Dec. 10, 1930
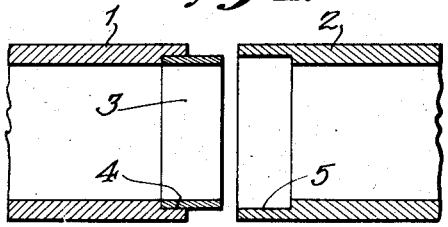
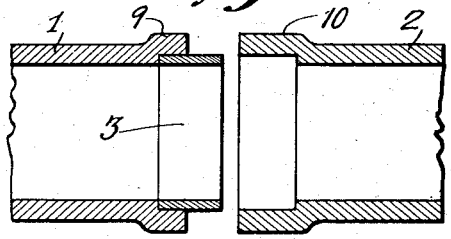
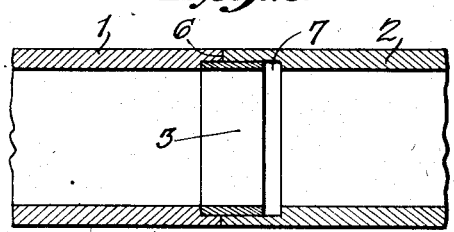
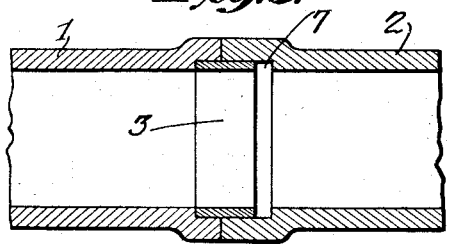
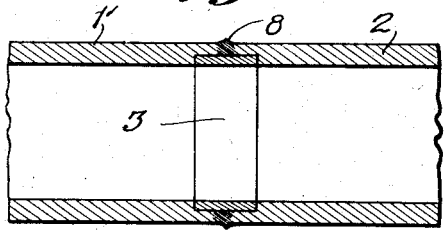
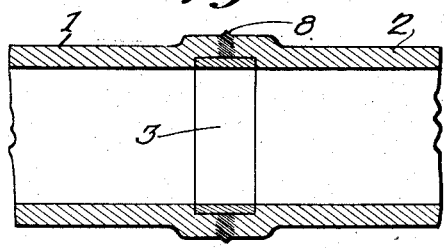
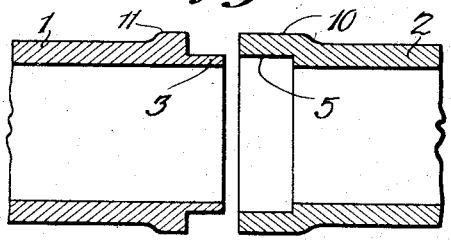
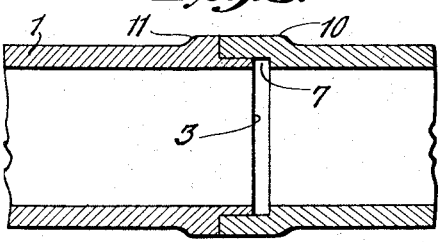
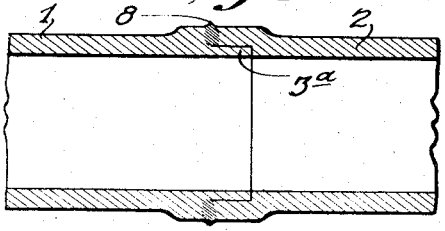
INVENTOR
Thomas E. Murray Jr.
BY
ATTORNEYS

UNITED STATES PATENT OFFICE

THOMAS E. MURRAY, JR., OF BROOKLYN, NEW YORK, ASSIGNOR TO METROPOLITAN ENGINEERING COMPANY, OF BROOKLYN, NEW YORK, A CORPORATION OF NEW YORK

METHOD OF WELDING HOLLOW ARTICLES

Application filed December 10, 1930. Serial No. 501,195.

This invention relates to a method of welding hollow articles and more particularly to a method of butt welding tubular articles end to end, and to the welded article resulting from such method.

When hollow articles such as tubes and pipes are welded in end to end position, as in electric butt welding, with a consequent take-up or upsetting of the metal at the weld, a burr is formed at the inner surface of the weld as well as at its outer surface. This burr extending into the hollow article in a flange-like manner constricts it and, if the hollow article is used as a pipe or conduit, acts as a resistance and obstruction to the flow of fluids therethrough or, if the interior space is used for other purposes, it interferes with such utilization of the space. Such burrs are very difficult to remove, particularly if the tubular article is one of considerable length and of a narrow diameter in proportion to its length.

The object of the present invention is to provide a method of welding hollow articles and to provide a welding construction in which an objectionable burr of the above type is avoided.

The various features of the invention are illustrated in the accompanying drawing, in which—

Fig. 1 is a longitudinal section of two tubular hollow articles such as a pipe and a liner member or ring in displaced position before welding.

Fig. 2 is a longitudinal sectional view of the parts shown in Fig. 1 in position to be welded or at the start of the weld.

Fig. 3 is a longitudinal section of the completed weld.

Figs. 4, 5 and 6 are longitudinal sectional views similar to those of Figs. 1, 2 and 3, respectively, of a modified form of the invention, and Figs. 7, 8 and 9 are similar views of a still further modification of the parts to be welded.

In my present invention a protective liner piece is positioned within the tubular article at the place where the weld is to be made so that when the two parts to be welded are brought to a welding temperature and pressed together with an opposed force, the metal is prevented, by the protective liner, from flowing inwardly and forming a burr on the inner surface of the welded article.

The protective liner is preferably of such dimensions that its inner surface is of the same diameter as the part which is in alignment with the inner surface of the adjacent parts or areas of the welded article. It may be formed integrally with one of the parts to be welded together, the other part being recessed or offset to accommodate it, or it may be a removable ring or member inserted in the offset parts of the two articles to be welded together.

Referring more particularly to the modification shown in Figs. 1, 2 and 3, the invention is illustrated as applied to welding two ends of two tubular members or pipes 1 and 2. Before the ends of the pipes or tubes 1 and 2 are brought into abutment, a liner ring 3 is placed between them. The adjacent or opposed ends of the pipes 1 and 2 are recessed as at 4 and 5 to receive the liner member 3, and the liner member 3 may, therefore, have an inner diameter equal to the normal diameter of the tubes or pipes and its inner surface is, therefore, in alignment with the inner surface of the pipes. The sum of the length of the recesses 4 and 5 is greater than the length or breadth of the liner member 3, so that when the outer or end edges of the pipes 1 and 2 are brought together, as at 6 in Fig. 2, there is a space 7 between one end of the liner 3 and the edge of the recess 5 so as to permit the pipes 1 and 2 to be brought together, with a take-up of metal equal to the distance 7. With the pipe ends in the position shown in Fig. 2, a heavy current is passed between the ends of the pipes 1 and 2 through the abutting edges 6, the intensity of the current being sufficient to bring the metal at the edges 6 to a welding temperature.

Immediately following or simultaneously with this heating of the metal, the pipes are pressed toward each other in a longitudinal direction causing the metal at the edges 6 to be compressed and displaced. The displacement of metal caused by this compression or take-up is prevented from flowing inwardly by the liner 3 and, therefore, flows outwardly to form a burr as indicated in the welded section 8 of Fig. 3.

In the form of pipe ends shown in Figs. 1, 2 and 3, in which a recess is formed, the metal of the pipe is necessarily thinner at this recess and, therefore, weakened as compared with the other part of the pipe.

In the modification shown in Figs. 4, 5 and 6, instead of offsetting the inner surface of the pipe or tube by forming a recess, the entire end part of the wall of the tubular article is offset, as shown at 9 and 10, to receive the liner 3 in a recess in the inner surface of the pipe ends without thinning the walls of the pipe surrounding the liner 3. Otherwise the method of welding and the construction of the weld is the same as that shown in Figs. 1, 2 and 3.

In the modification shown in Figs. 7, 8 and 9, instead of recessing both ends of the pipe to be welded and using a separate collar as a liner, only the pipe end 2 is recessed or offset and, instead of recessing the pipe 1 and using a separate collar, this pipe is provided with a thickened part 11 having approximately the same exterior diameter as the offset part 10 of the pipe 2, and having a longitudinally projecting circular flange 3a that fits into the recess 5 formed by the outward offsetting of the end of the pipe 2. The enlarged or offset end 10 of the pipe 2 of this modification is so proportioned as to slide over and fit about the circular flange 3a and to fit and abut the end of the thickened part 11 as shown in Fig. 9. These parts are then electrically heated and are pressed together with an upsetting of the welding of the metal as indicated at 8 in Fig. 9.

Through the above invention it is, therefore, possible to electrically butt weld two tubular or hollow articles such as lengths of pipe in such a manner as to avoid entirely the formation of an internal burr and to provide a smooth, continuous inner surface on such welded articles.

What I claim is:

1. A method of welding parts in a hollow article which comprises offsetting the inner surfaces of said parts to receive a lining piece, placing a lining piece in the offset section of said parts, abutting the offset edges together about the lining piece, heating the edges to a welding temperature, and compressing the parts together to upset the abutting edges on the outer surface of said lining piece.

2. A method of welding two tubular articles end to end which comprises outwardly offsetting the ends of the tubular articles, fitting said offset ends over a liner member adapted to seat in said offset recess with the offset ends of the articles in abutment with each other on the outside of said liner, and then butt welding said ends together exteriorly of said liner.

3. A method of welding two tubular articles end to end which comprises outwardly offsetting the ends of said articles inserting a liner ring in the outwardly offset ends of said articles, said liner having a length substantially less than the combined depths of said offset sections, and butt welding said pipes exteriorly of said liner ring.

4. The method of uniting two tubular articles end to end which comprises shaping the tubular end of one article to provide an annular offset shoulder thereon adjacent the end with the tubular end extending therebeyond, shaping the tubular end of the other article to provide an annular offset section having a recess adapted to receive the extending tubular end of the first article with the end of said tubular offset section being adapted to rest in abutting relationship upon the offset shoulder of the first article, heating the abutting edges to a welding temperature and then compressing them together to complete the weld union.

5. The method of uniting two tubular articles end to end which comprises shaping the tubular end of one article to provide an annular offset shoulder thereon adjacent the end with the tubular end extending therebeyond, shaping the tubular end of the other article to provide an annular offset section having a recess adapted to receive the extending tubular end of the first article with the end of said tubular offset section being adapted to rest in abutting relationship upon the offset shoulder of the first article, the depth of said recess being substantially greater than the length of the tubular end of the first article, heating the abutting edges to a welding temperature and then compressing them together to complete the weld union.

In witness whereof, I have hereunto signed my name.

THOMAS E. MURRAY, Jr.